July 9, 1946.   D. E. LIPFERT   2,403,867
FLOW METER
Filed Nov. 30, 1943   2 Sheets-Sheet 2
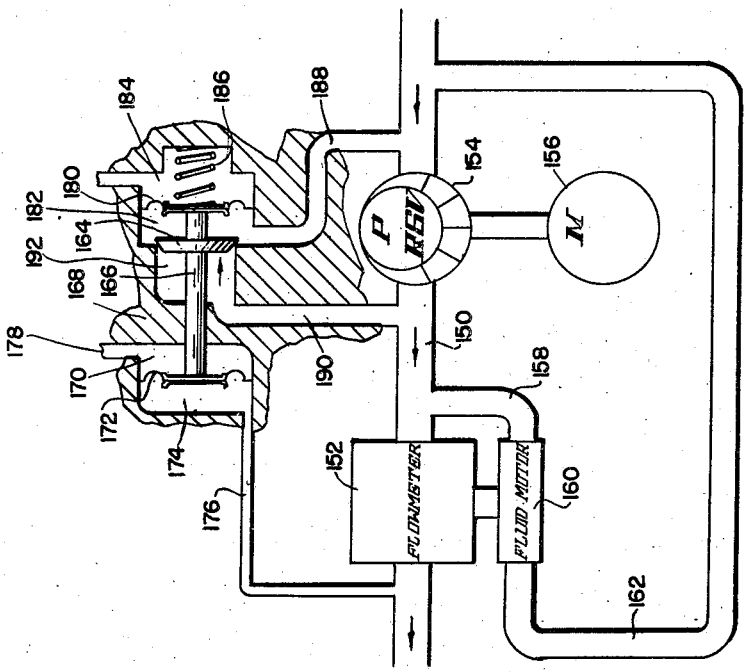
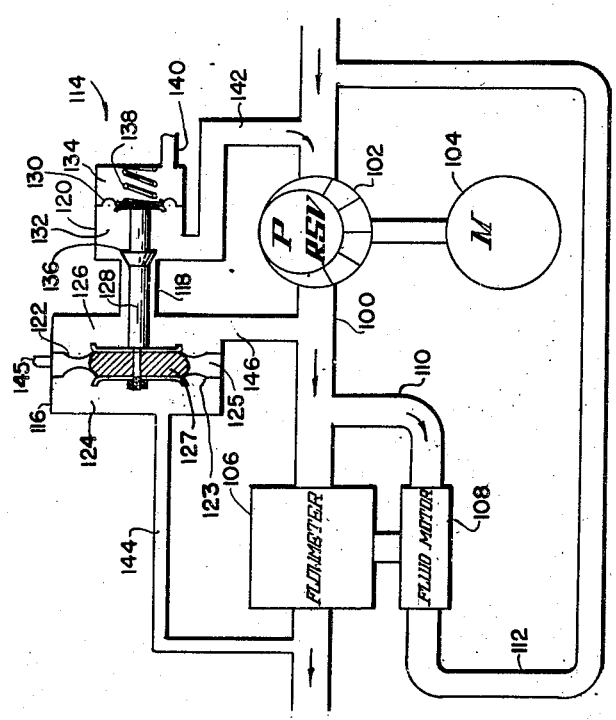
INVENTOR
DONALD E. LIPFERT
BY Lester W Clark
AGENT Patented July 9, 1946

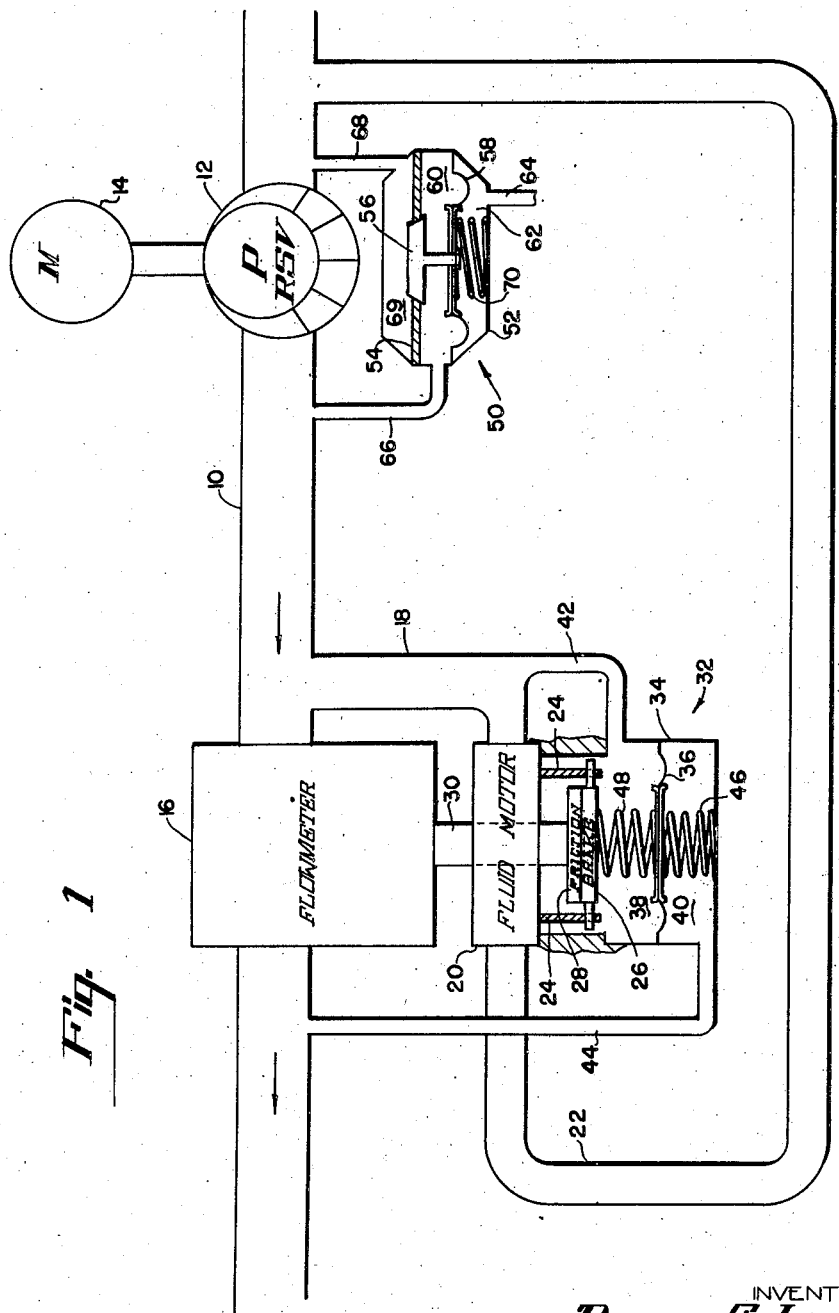

2,403,867

UNITED STATES PATENT OFFICE 2,403,867

FLOWMETER

Donald E. Lipfert, Meriden, Conn., assignor to Chandler-Evans Corporation, South Meriden, Conn., a corporation of Delaware Application November 30, 1943, Serial No. 512,309

10 Claims. (Cl. 73—232)

This invention relates to meters for measuring the flow of fluid in a conduit.

Flow meters of the type in which the measuring element is rotated in accordance with the speed of the fluid flowing past it are subject to error because of the leakage of the fluid past the meter element. This leakage varies with the pressure differential across the meter element and hence is difficult to take into account in the calibration of the meter. It has been proposed to drive such a meter from an external source of power so that the pressure differential across the meter is maintained constant. The error due to leakage past the meter element is therefore also maintained constant and may be readily compensated by proper calibration of the meter. Prior devices of this type could be used only with a motor driven by an external source of power, and hence would be limited in their application to places where such external sources were available. Furthermore, the apparatus required where such an external source is used tends to be large and unwieldy.

An object of the present invention is to provide improved flow measuring means.

Another object is to provide a rotary flow meter including means for driving the rotating element of the flow meter by utilizing power taken from the fluid stream being measured, and at the same time maintaining a substantially constant pressure differential across the rotary element.

Another object is to provide fluid flow measuring means including a rotary meter element of the displacement type, and a fluid motor for driving the meter, and means for controlling the speed at which the motor drives the meter element in accordance with the pressure drop across the element.

A further object is to provide flow measuring means of the type described in which the meter speed is controlled by varying the loading on a friction brake which is attached to the motor shaft.

A further object is to provide an improved system for measuring the flow of fluid supplied by a pump provided with a by-pass valve for controlling the discharge pressure, including a rotary flow meter, a fluid motor connected across the pump for driving the flow meter, and means responsive to the pressure differential across the flow meter for controlling the by-pass valve.

Other objects and advantages of the present invention will become apparent from a consideration of the appended specification, claims and drawings, in which Figure 1 is a somewhat diagrammatic illustration of the fluid flow measuring system utilizing the principles of my invention, Figure 2 illustrates a modification, and Figure 3 illustrates another modification.

Referring to Figure 1, there is shown a conduit 10, thru which a flow of fluid is induced by a pump 12 driven by a motor 14. A flow meter 16, of any suitable rotary displacement type, is connected in the conduit 10. A branch conduit 18 conveys a portion of the fluid discharged by the pump to a fluid motor 20 and thence thru a conduit 22 back to the inlet side of the pump 12.

The fluid motor 20 rotates a shaft 30 connected to the flow meter 16. A friction brake member 28 is fixed on the shaft 30 and cooperates with a relatively stationary brake member 26. The brake member 26 is held against rotation by guides 24. The brake members 26 and 28 are held in engagement with a variable force which depends upon the pressure differential across the flow meter 16.

A pressure differential responsive device generally indicated at 32 includes a casing 34 divided by a flexible diaphragm 36 into a pair of expansible chambers 38 and 40. The chamber 38 is connected thru a conduit 42 and the conduit 18 to the conduit 10 at the upstream side of flow meter 16. The chamber 40 is connected thru a conduit 44 to the conduit 10 at the downstream side of the flow meter 16. A spring 46 is retained between diaphragm 36 and the housing 34, and another spring 48 is retained between the diaphragm 36 and the clutch member 26.

The pressure of the fluid discharged by the pump 12 is controlled by a relief valve generally indicated at 50. The relief valve 50 includes a housing 52 having a partition 54 extending across it. A valve 56 seats in an opening in the partition. A flexible diaphragm 58 extends across the casing 52 forming a chamber 60 between the diaphragm 58 and partition 54 and a chamber 62 between the diaphragm 58 and casing 52. The chamber 62 is vented, as at 64, to the atmosphere, or to any suitable source of substantially constant pressure. A spring 70 is retained in chamber 62 between diaphragm 58 and housing 52. The chamber 60 is connected thru a conduit 66 to the discharge side of the pump 12, and a chamber 69 on the opposite side of partition 54 from chamber 60 is connected thru a conduit 68 to the inlet side of pump 12.

The relief valve 50 operates in accordance with well-known principles to maintain a substantially constant pressure at the discharge side of pump 12. The value of this pressure depends upon the strength of spring 70. If desired, means may be provided for adjusting the initial loading of the spring 70.

*Operation of Figure 1*

As long as the quantity of fluid flowing thru the conduit 10 remains constant, the speed of flow meter 16 remains constant and may be indicated or recorded by any suitable apparatus for measuring the velocity of a rotating element. Since the power for rotating the meter 16 is supplied by the motor 20, the amount of power required by the particular indicating or recording apparatus used does not affect the meter reading, as the motor 20 will supply any amount of power necessary to rotate the meter and its associated indicating or recording apparatus at the speed required to maintain a substantially constant pressure drop across the meter.

If the quantity of fluid flowing thru conduit 10 increases, the pressure drop across the flow meter 16 tends to increase. This pressure differential, acting on diaphragm 36, moves the latter downwardly, thereby decreasing the braking force which opposes motor 20, and causing the speed of the meter to increase until the pressure differential across it is restored to its previous value.

Strictly speaking, the pressure differential across the meter is not restored to its exact previous value. It may be observed that the braking force applied varies inversely as the pressure differential across the meter. Because of the very small travel of diaphragm 36 required to produce a substantial variation in the braking force, a small variation in the pressure differential across the meter is sufficient to cause a variation of the braking force throughout its effective range. Therefore, an increase in the quantity of fluid flowing results in a small increase in the pressure differential across the meter, just so much as is necessary to cause a decrease in the braking force and a consequent increase in the motor and meter speed proportional to the increase in flow. It has been found that by proper design of the diaphragm 36 and the springs 46 and 48, the variation in the pressure differential may be made sufficiently small that there is no substantial error in the flow measurement due to the varying leakage thru the meter.

*Figure 2*

In this figure there is shown a conduit 100, in which a flow of fluid is induced by a pump 102 driven by a motor 104. A flow meter 106 is connected in the conduit 100. The flow meter 106 is driven by a fluid motor 108, which receives its motive fluid from the discharge side of pump 102 thru a conduit 110. The fluid discharged by motor 108 is conveyed by a conduit 112 to the inlet side of pump 102.

The pressure at the discharge side of pump 102 is controlled by a valve mechanism generally indicated at 114. The valve mechanism 114 includes a housing 116 connected by a conduit 118 to another housing 120. The housing 116 is separated by a pair of diaphragms 122 and 123 into three expansible chambers 124, 125 and 126. The central portions of the diaphragms 122 and 123 are attached to a spacer block 127 and to a valve stem 128 which extends thru the conduit 118 into the housing 120. The housing 120 is separated by a flexible diaphragm 130 into a pair of expansible chambers 132 and 134. Inside the chamber 132, the stem 128 carries a valve 136.

The valve 136 seats against the edge of the opening of conduit 118 into chamber 132. A spring 138 is retained between the diaphragm 130 and the casing 120 in the chamber 134, and biases the valve 136 towards closed position thru the stem 128, which also is attached to the center of diaphragm 130. Means may be provided for adjusting the loading of spring 138.

The chamber 134 is vented, as at 140, to atmosphere or any other source of substantially constant pressure. The chamber 132 is connected thru a conduit 142 to the inlet side of pump 102. The chamber 124 is connected thru a conduit 144 to the downstream side of meter 106. The chamber 125 is vented to the atmosphere at 145, and the chamber 126 is connected thru a conduit 146 to the upstream side of meter 106.

The double diaphragm construction and the chamber 125 are provided to eliminate difficulties which may occur when a single diaphragm is used and the loading on spring 138 is very small. Under such conditions, the system maintains a very small pressure differential across the flow meter, and when the flow is changing, the direction of the resultant force may reverse. If a single diaphragm is used, the direction of the bulge in the diaphragm reverses at such times. If the volumetric capacity of the bulge is appreciable as compared to the capacity of conduits 144 and 146, as is usually the case, then the change in direction of the bulge delays the movement of the valve 136 until the quantity of fluid necessary to make up for the change in the relative capacities of chambers 124 and 126 has moved thru the conduits 144 and 146. This time lag may cause an undesirable "hunting" condition to be initiated, wherein the diaphragm flaps back and forth from one direction to the other, resulting in fluctuating operation of the meter.

By using the double diaphragm construction and the intermediate vented chamber 125, this difficulty may be avoided, since the pressures in chambers 124 and 126 are always above atmospheric and the diaphragms 122 and 123 always bulge toward the chamber 125.

*Operation of Figure 2*

It may be seen that the pressure drop across the meter 106 acts on diaphragms 122 and 123 to control the valve 136. The diaphragm 130 is provided to balance the valve 136 against the pressure in chamber 132. The spring 138 establishes the value of the constant pressure differential maintained across diaphragms 122 and 123.

If the quantity of fluid flowing thru the conduit 100 increases, the pressure differential across meter 106 increases, causing the valve 136 to move toward closed position, thereby increasing the pressure of the fluid discharged by pump 102. This increased pressure causes the motor 108 to run faster, thereby increasing the speed of meter 106 until it is again a true measure of the quantity of fluid flowing thru conduit 100. The pressure differential across the flow meter 106 is thereby reduced to the previously established constant value.

Strictly speaking, the pressure differential across the meter is not restored to its exact previous value. It may be observed that the motor speed varies directly as the pressure of the fluid discharged by the pump. Because of the very small travel of valve 136 required to produce a substantial variation in the meter speed, a small variation in the pressure differential across the meter is sufficient to cause a variation of the meter speed throughout its effective range. Therefore, an increase in the quantity of fluid flowing results in a small increase in the pressure differential across the meter, just so much as is necessary to cause an increase in the pump discharge pressure and a consequent increase in the motor and meter speed proportional to the increase in flow. It has been found that by proper design of the diaphragm 122 and the spring 138, the variation in the pressure differential may be made sufficiently small that there is no substantial error in the flow measurement due to the varying leakage thru the meter.

*Figure 3*

In the modification shown in Figure 3, the quantity of fluid flowing thru a conduit 150 is measured by a rotary flow meter 152. This flow is produced by a pump 154 driven by a motor 156. A portion of the fluid discharged by the pump 154 is conveyed thru a conduit 158 to a fluid motor 160, which drives the meter 152. The fluid discharged by motor 160 is conveyed thru a conduit 162 to the inlet of pump 154.

The pressure at the discharge side of pump 154 is controlled by a relief valve 164. The valve 164 is attached to a valve stem 166 which extends thru a casting 168 into a chamber 170 formed between the casting 168 and a flexible diaphragm 172. Another expansible chamber 174, on the opposite side of diaphragm 172, is connected thru a conduit 176 to the downstream side of the flow meter 152. The chamber 170 is vented, as at 178, to atmosphere or any other suitable source of substantially constant pressure.

On the opposite side of valve 164, the stem 166 is attached to the center of a diaphragm 180 which separates a pair of expansible chambers 182 and 184 formed in the casting 168. A spring 186 is retained between diaphragm 180 and the casting 168, and biases the valve 164 toward closed position. The chamber 182 is connected thru a conduit 188 to the inlet side of pump 154. A conduit 190 connects the discharge side of pump 154 to a chamber 192 under the valve 164.

*Operation of Figure 3*

The diaphragm 180 is provided to balance the valve 164 against changes in pressure in the chamber 182. The spring 186 establishes a constant force required to open the valve 164. The pressure at the discharge side of pump 154 acts on the valve 164 in an opening direction. The pressure on the downstream side of flow meter 152 also acts, thru diaphragm 172, on the valve 164 in an opening direction.

Since the pump outlet pressure and the meter outlet pressure act together on the valve 164, it may be seen that the valve 164 regulates the pump outlet pressure as a function of the sum of that pressure and the meter outlet pressure. Furthermore, the meter outlet pressure varies directly with the pump outlet pressure. However, the meter outlet pressure differs from the pump outlet pressure by the pressure differential across the meter.

The pressure differential across the meter tends to vary directly with the rate of flow, however. Therefore, an increase in the rate of flow results in a decrease in the sum of the pump outlet pressure and the meter outlet pressure. This causes a closing movement of valve 164 and a consequent increase in both the pump outlet pressure and the meter outlet pressure to restore the sum of those pressures substantially to its previous value. Simultaneously, the increase in the pump outlet pressure causes an increase in the speed of motor 160 and meter 152 which is effective to reduce the pressure differential thru the meter. It has been found that if the diaphragm 172 and the valve 164 are properly proportioned, the speed of the motor 160 and meter 152 may be maintained substantially proportional to the fluid flow.

While I have shown and described certain preferred embodiments of my invention, other modifications thereof will readily occur to those skilled in the art, and I therefore intend my invention to be limited only by the appended claims.

I claim as my invention:

1. Apparatus for measuring the flow of fluid thru a conduit, comprising a rotary flow meter in said conduit, a pump for forcing fluid thru said conduit, fluid motor means for driving said meter, means for conveying motive fluid to said motor means from the upstream side of said meter, and means responsive to the pressure differential across said meter for controlling the supply of fluid to said motor means.

2. Apparatus for measuring the flow of fluid thru a conduit, comprising a rotary flow meter in said conduit, a pump for forcing fluid thru said conduit, fluid motor means for driving said meter, means for conveying motive fluid to said motor means from the discharge side of said pump, means for conveying fluid discharged by said motor means to the inlet side of said pump, and means responsive to the pressure differential across said meter for controlling the pressure differential across said pump.

3. Apparatus for measuring the flow of fluid thru a conduit, comprising a rotary flow meter in said conduit, a pump for forcing fluid thru said conduit, fluid motor means for driving said meter, means for conveying motive fluid to said motor means from the discharge side of said pump, means for conveying fluid discharged by said motor means to the inlet side of said pump, valve means for by-passing fluid from the discharge side to the inlet side of said pump to control the pressure at said discharge side, and means responsive to the pressure differential across said meter for controlling said valve means.

4. Apparatus for measuring the flow of fluid thru a conduit, comprising a rotary flow meter in said conduit, a pump for forcing fluid thru said conduit, fluid motor means for driving said meter, means for conveying motive fluid to said motor means from the discharge side of said pump, means for conveying fluid discharged by said motor means to the inlet side of said pump, valve means for by-passing fluid from the discharge side to the inlet side of said pump to control the pressure at the discharge side, and means responsive to the pressure at the downstream side of said meter for controlling said valve means.

5. Apparatus for measuring the flow of fluid thru a conduit, comprising a rotary flow meter in said conduit, fluid motor means for driving said meter, brake means for retarding said motor means and said meter, means for conveying motive fluid to said motor means from the upstream side of said meter and means responsive to the pressure differential across said meter for controlling the force of said brake means to control the speed of said motor means.

6. Apparatus for measuring the flow of fluid thru a conduit, comprising a rotary flow meter in said conduit, a pump for forcing fluid thru said conduit, fluid motor means for driving said meter, means for conveying motive fluid to said motor means from the discharge side of said pump, means for conveying fluid discharged by said motor means to the inlet side of said pump, valve means for by-passing fluid from the discharge side to the inlet side of said pump to control the pressure at the discharge side, means responsive to the pressure at the downstream side of said meter for controlling said valve means, and means responsive to the pressure at the discharge side of said pump to additionally control said valve means.

7. Apparatus for measuring the flow of fluid thru a conduit, comprising a rotary flow meter in said conduit, fluid motor means for driving said meter, a pump for forcing fluid thru said conduit, means for conveying motive fluid to said motor means from the upstream side of said meter, and means responsive to the pressure differential across said meter for controlling the speed with which said meter is driven by said motor, said last-named means comprising three aligned expansible chambers separated by two flexible diaphragms, means connecting the end chambers to the opposite sides of said meter, and means for venting the intermediate chamber.

8. Apparatus for measuring the flow of fluid thru a conduit, comprising a rotary flow meter in said conduit, a pump for forcing fluid thru said conduit, fluid motor means for driving said meter, passage means for conveying a part of the fluid discharged by said pump to said motor means for use therein as a motive fluid, means for conveying all the fluid discharged by said motor means to the inlet side of said pump, valve means for by-passing fluid from the discharge side to the inlet side of said pump, and means for controlling the pressure drop across said meter to maintain said pressure drop substantially constant and for controlling the pressure at the discharge side of said pump, said controlling means including a first movable wall subject to the pressure at the downstream side of said meter, and a second movable wall subject to the pressure at the upstream side of said meter, at least the second of said walls being associated with said valve means for positioning the same.

9. Apparatus for measuring the flow of fluid thru a conduit, comprising a rotary flow meter in said conduit, a pump for forcing fluid thru said conduit, fluid motor means for driving said meter, passage means for conveying a part of the fluid discharged by said pump to said motor means for use therein as a motive fluid, means for conveying all the fluid discharged by said motor means to the inlet side of said pump, valve means for by-passing fluid from the discharge side to the inlet side of said pump, means including a first movable wall subject to the pressure drop across said meter for controlling the speed of said motor means to maintain said pressure drop substantially constant, and means for controlling the pressure at the discharge side of said pump including a second movable wall subject to the pressure at the upstream side of said meter, and a connection between said second wall and said valve means for positioning the same.

10. Apparatus for measuring the flow of fluid thru a conduit, comprising a rotary flow meter in said conduit, a pump for forcing fluid thru said conduit, fluid motor means for driving said meter, means for conveying motive fluid to said motor means from the discharge side of said pump, means for conveying fluid discharged by said motor means to the inlet side of said pump, valve means for by-passing fluid from the discharge side to the inlet side of said pump, and means for controlling the pressure drop across said meter to maintain said pressure drop substantially constant and for controlling the pressure at the discharge side of said pump, said controlling means including a first movable wall subject to the pressure at the downstream side of said meter, and a second movable wall subject to the pressure at the upstream side of said meter, both of said walls being associated with said valve means for positioning the same.

DONALD E. LIPFERT.